United States Patent
Bergmans

(10) Patent No.: US 6,463,435 B1
(45) Date of Patent: Oct. 8, 2002

(54) HANDLING OF SECURITY CODES FOR DIGITAL IMAGE DATA FILES

(75) Inventor: Jacques J. H. Bergmans, Grubbenvorst (NL)

(73) Assignee: Océ-Technologies B.V., Ma Venlo (NL)

(*) Notice: Subject to any disclaimer, the term of this patent is extended or adjusted under 35 U.S.C. 154(b) by 0 days.

(21) Appl. No.: 09/272,127

(22) Filed: Mar. 19, 1999

(30) Foreign Application Priority Data

Mar. 19, 1998 (NL) ............................................. 1008642
Mar. 19, 1998 (NL) ............................................. 1008643
Apr. 16, 1998 (NL) ............................................. 1008896

(51) Int. Cl.[7] ............................................. G06F 17/30
(52) U.S. Cl. .............................. 707/9; 358/1.13; 399/80
(58) Field of Search .................. 707/1–10, 104, 707/514; 713/160–164; 399/366, 80, 81; 705/29; 380/243; 358/1.13, 1.15

(56) References Cited

U.S. PATENT DOCUMENTS

| | | | |
|---|---|---|---|
| 5,596,640 A | | 1/1997 | Ohta |
| 5,752,152 A | * | 5/1998 | Gasper et al. .............. 399/366 |
| 5,764,980 A | * | 6/1998 | Davis et al. ................ 707/104 |
| 5,765,176 A | * | 6/1998 | Bloomberg .................. 707/514 |
| 6,017,157 A | * | 1/2000 | Garfinkle et al. ............. 705/26 |
| 6,181,893 B1 | * | 1/2001 | Collard et al. ................ 399/80 |
| 2002/0027673 A1 | * | 3/2002 | Roosen et al. ............. 385/1.13 |

FOREIGN PATENT DOCUMENTS

| | | |
|---|---|---|
| EP | 0208342 | 12/1991 |
| EP | 0689157 A2 | 12/1995 |
| EP | 0689157 | 12/1995 |
| EP | 0756414 A2 | 1/1997 |
| EP | 0830005 A2 | 3/1998 |

* cited by examiner

Primary Examiner—Hosain T. Alam
Assistant Examiner—Anh Ly
(74) Attorney, Agent, or Firm—Birch, Stewart, Kolasch, & Birch, LLP

(57) ABSTRACT

A digital image processing apparatus is provided which offers, for selection by an operator, at least one digital image data file for the purpose of further handling, e.g. printing. A file of this kind can be protected with a code which must first be input by the operator before the apparatus releases the file. If a number of files thus protected are selected and processed either together or in series by an operator, after the first file the apparatus first tries out for each subsequent file whether the code applicable for the preceding file is also valid for the new file. If so, the apparatus releases the file immediately, whereas otherwise it asks for a code again.

14 Claims, 14 Drawing Sheets

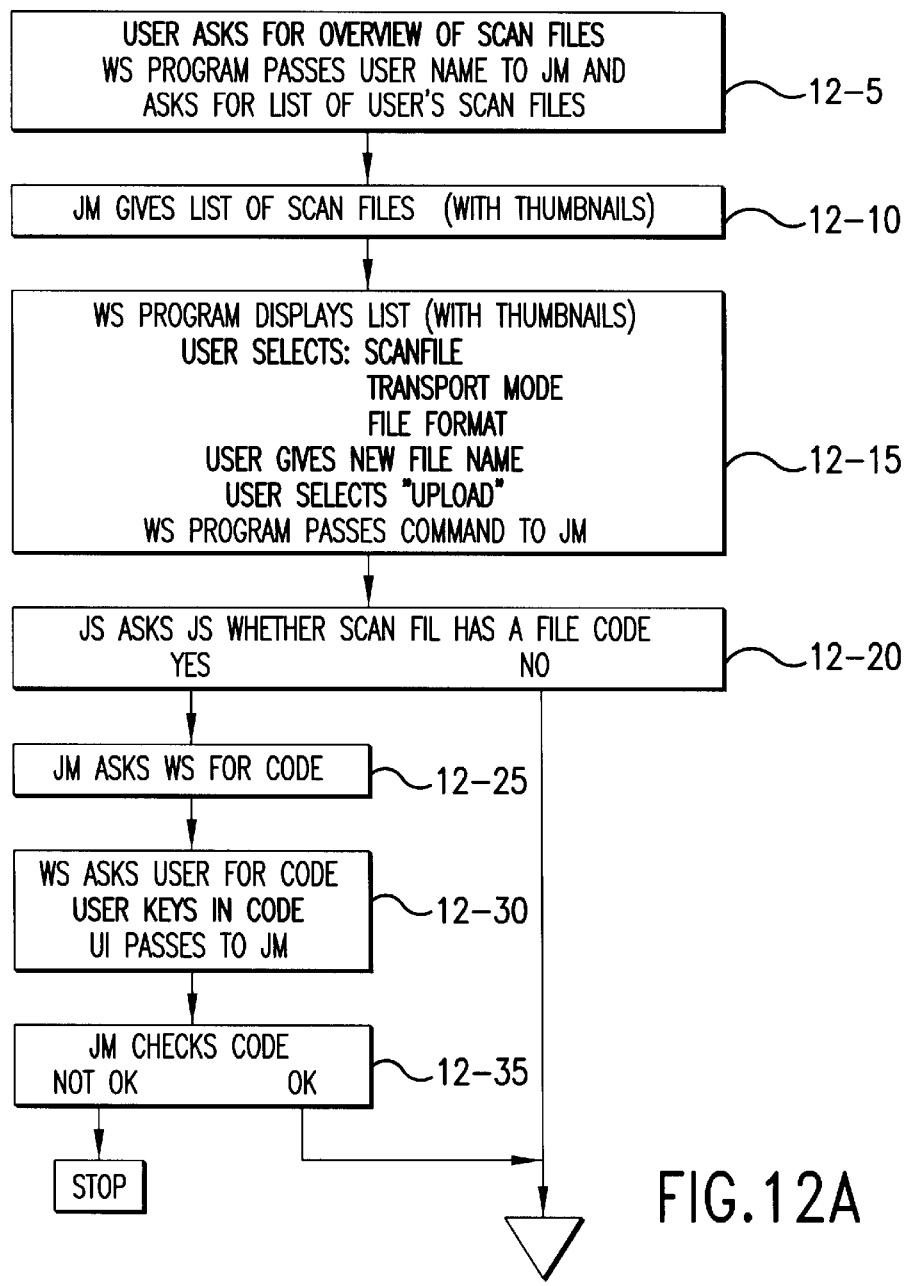
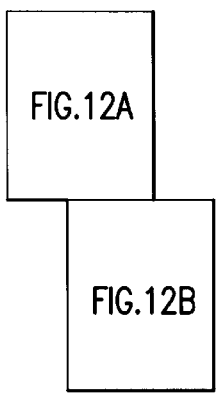
FIG.12A
FIG.12

HANDLING OF SECURITY CODES FOR DIGITAL IMAGE DATA FILES

BACKGROUND OF THE INVENTION

1. Technical Field of the Invention

The invention relates to a method of making available digital image data files in a digital image processing apparatus, including offering for selection by an operator at least one digital image data file for the purpose of further handling. The invention also relates to an apparatus performing the inventive methods.

2. Description of Related Art

A method of this kind is known from EP-A 0 689 157. This known method is aimed at printing digital image data files prepared in a workstation connected via a local network to a printing apparatus, wherein a file is not printed immediately, but is simply stored in the memory of the printing apparatus and is not printed until it has been selected by an operator at the printing apparatus control panel. This specific manner of printing is termed "interactive printing".

EP-B 0 208 342 is another conventional method of printing digital image data files in which a file is protected by a code. Only when an operator has keyed in on the printing apparatus control panel a code corresponding to this security code is the file really printed. In this way, unauthorized personnel can be prevented from printing a file and thus gaining confidential information. The system described in that document, however, is not suitable for use with more than one print file at a time, so that a handling session is always limited to one file. Accordingly, the use of a series of protected files is not involved there.

If a user now sends various print files to such conventional systems, each provided with a security code, from his workstation to the printing apparatus, it is inconvenient to use a separate code for each file. The user must then exactly remember what code he has input for each file. As a rule, a user will therefore prefer always to use the same code. As long as that one code is not known to others, it does not cause any security problems.

In the light of these considerations it is a disadvantage that in the case of a series of protected files an access code has to be input again by the user for each protected file, all the more so in that in many cases it is always the same code. The user finds this an unnecessary waste of time.

There is therefore a need for a release procedure which burdens the operator with a request to key in the code only in essential cases (i.e. those cases in which a different code is used).

SUMMARY OF THE INVENTION

It is therefore, an object of the present invention to solve the above-noted is problems and meet the needs created by conventional systems.

The invention achieves these objects by disclosing a method that includes the following steps:

after selection of at least one file by the operator, checking whether the selected file is provided with a security code;

if a selected file is provided with a security code, asking the operator to input an access code corresponding to the security code; and if the operator inputs the correct access code, releasing the selected file for the further handling; wherein a) in a procedure for releasing a first file provided with a security code the correct access code is maintained for an uninterrupted series of selection actions by the operator, b) in a procedure for releasing a second file provided with a security code, which procedure follows on at least one procedure for releasing a first file provided with a security code, a trial run is first automatically carried out as to whether a maintained access code for the first file is also correct for the second file, and c) if no access code correct for the second file appears to be available the operator is asked to input an access code for the same.

As a result, the user as a rule need input a code only once to be able to process all the files. For extra-rapid processing, the user can also select a number of files together, e.g. as is conventional in a Windows-based system, by actuating the control key simultaneously with the mouse button and indicate all the required files. During the processing, the files thus selected collectively will be released and processed one by one, the access code being asked for in the case of the first file and the other selected files being processed without further intervention on the part of the operator, always assuming that all the files are provided with the same security code.

In a first embodiment of the method according to the invention, all the codes used during a handling session (when there are more than one code) are maintained and tried out.

In an alternative embodiment, only the access code of the previous protected file is used. As a result the procedure becomes more difficult to survey and less flexible.

In a further embodiment of the method according to the invention, the release procedure is directed at releasing a data file for printing.

In yet another embodiment, the release procedure is aimed at releasing data files generated during a scanning process, either for printing or for sending to a workstation or some other destination on the network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12A–B are flow diagrams of a procedure for calling up a scan file from the apparatus according to the invention and FIG. 12 shows how the flow diagrams of FIGS. 12A–B fit together.

DETAILED DESCRIPTION OF PREFERRED EMBODIMENTS

Figure 1:
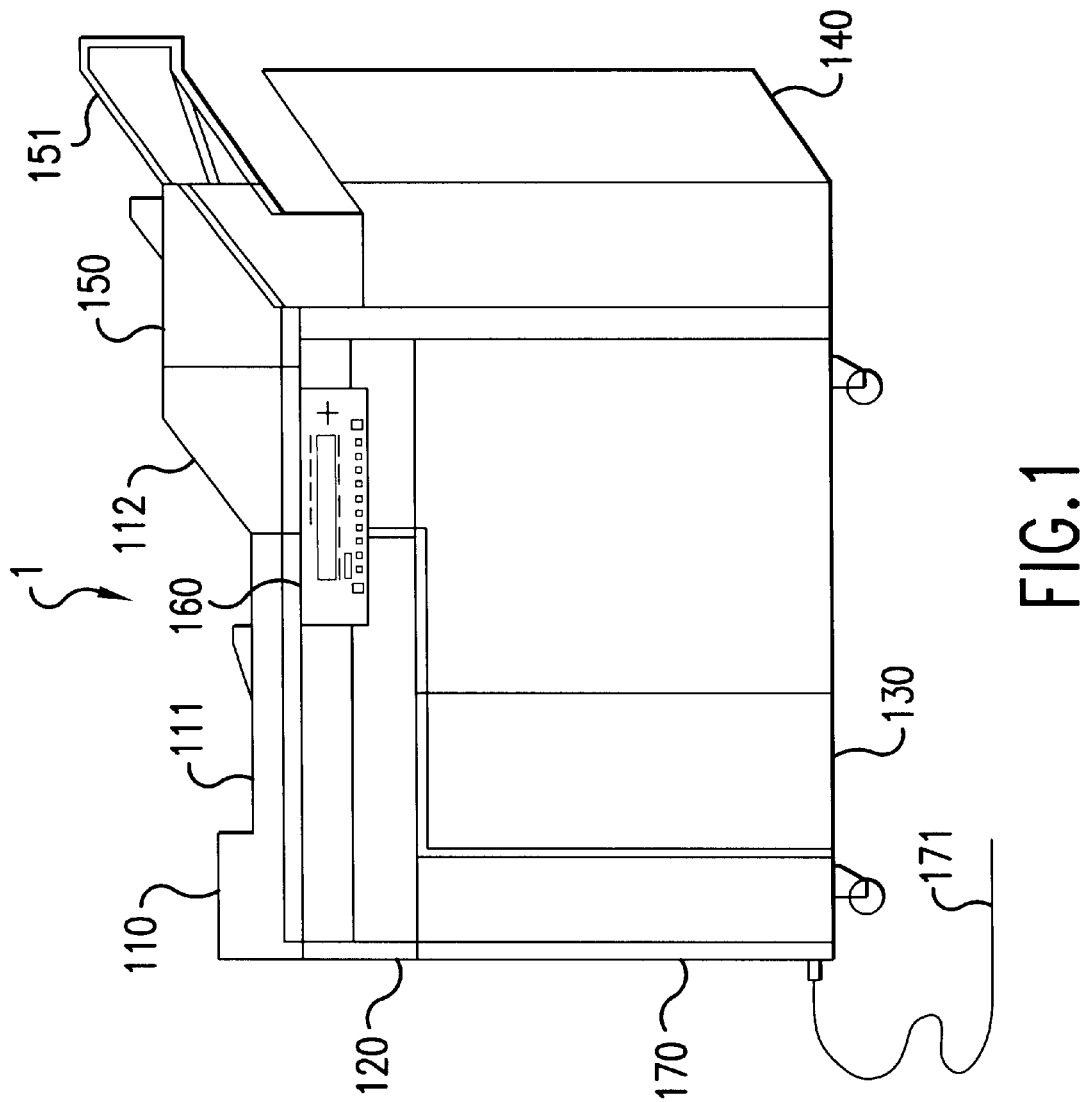
FIG. 1 illustrates the apparatus according to the invention.

FIG. 1 shows the apparatus according to the invention, on which the different parts are shown diagrammatically separately.

The document feeder 110 is provided with an input tray 111 for the introduction of a stack of documents, a transport mechanism (not shown) for transporting the documents one by one along the scanner unit 120, and a delivery tray 112, in which the documents are placed after scanning.

The scanner unit 120 includes a flat bed scanner provided with a glass platen on which an original document can be placed, a CCD array and an imaging unit consisting of a movable mirror and lens system for imaging the document on the CCD array. In these conditions the CCD array generates electrical signals which are converted into digital image data in manner known per se.

The printer unit 130 includes an electro-photographic processing section known per se, in which a photoconductive medium is charged, exposed with an LED array in accordance with digital image data, and is developed with toner powder, whereafter the toner image is transferred and fixed on an image support, usually a sheet of paper.

A stock of image supports in different formats and orientations is available in the supply section 140.

The image supports with the toner image are transported to the finishing and delivery section 150, which if necessary collects them into sets and staples them and then deposits them in the delivery tray 151.

An operator control panel 160 is provided on the apparatus for operation thereof. It is provided with a display and keys and is connected to an operator control unit (not shown here).

The control electronics are shown diagrammatically by reference 170. A cable 171 connects this section of the apparatus to a local network 10 (not shown here).

Figure 2:
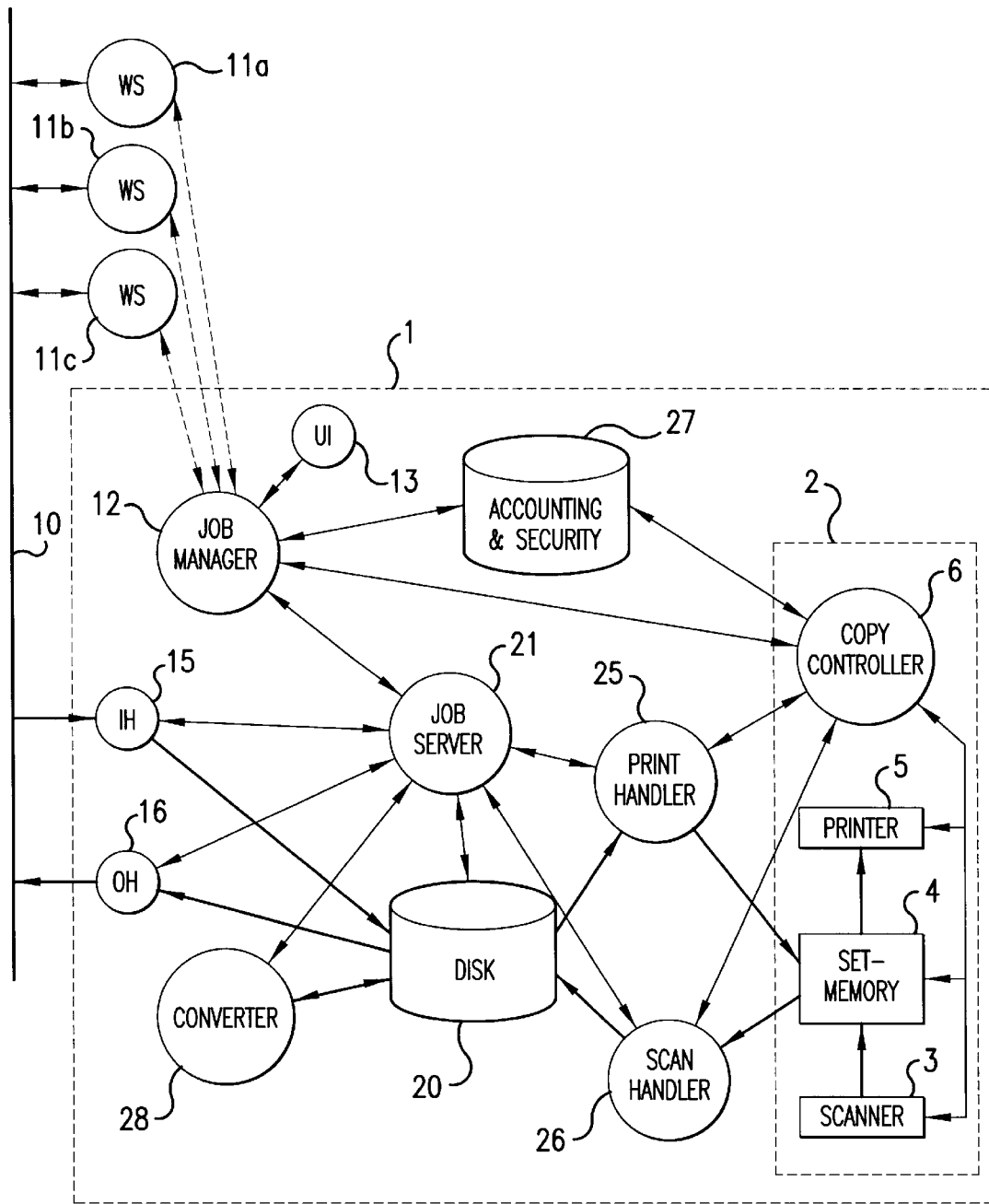
FIG. 2 is a diagram showing the constituent parts of the apparatus according to the invention.

FIG. 2 is a diagram showing the constituent parts of the apparatus according to the invention.

The apparatus 1 comprises a basic unit 2 which contains a scanner unit 3, a printer unit 4, a set memory 5 and a control unit 6 for these units, hereinafter termed the Copy-Controller.

The basic unit 2 contains the units and functions required for making a simple copy. The scanner 3 during the scanning of an original document generates digital image data and stores them in the set memory 4, whereafter the printer 5 reads out the image data from the set memory 4 and prints them on an image support, usually a sheet of paper. This process is controlled by the CopyController 6. The set memory 4 in this description also comprises an image processing function, although this is not essential to the present invention and is therefore not explained further.

The apparatus 1 also includes a number of units required to print digital image data which are fed via a local network 10 from a digital environment, and for exporting digital image data generated by the scanner 3 to the digital environment via the same local network 10.

The term "digital environment" as used here denotes one or more workstations 11a, 11b, 11c, on which a program is operative for communication with the apparatus according to the invention, and which are also connected to the local network 10.

The apparatus 1 is provided with:
 a management unit 12, hereinafter referred to as the: JobManager, which manages the processing processes and also updates an administration system for all the copying, scanning and print jobs present,
 an operator control unit 13, also termed a: UserInterface (UI), provided with an operator control panel on the apparatus housing, with a display and keys for operation of the apparatus 1,
 an InputHandler 15 for receiving and transmitting digital data reaching the apparatus via the network 10 from the digital environment and an OutputHandler 16 for sending digital data via the network 10 to the digital environment,
 a storage unit 20 formed by a high-capacity hard disk, a unit 21 hereinafter referred to as a JobServer for managing the data files on the storage unit 20 and for controlling the processing processes,
 a control unit 25 hereinafter referred to as a PrintHandler, which is dedicated to providing a printing process, and a control unit 26 hereinafter referred to as a ScanHandler, which is dedicated to providing a scanning process,
 an accounting and security unit 27, which inter alia manages the authorization of users and access codes,
 a conversion unit 28 for converting digital data files to different formats.

FIG. 2 shows control connections by means of thin arrows and data transport connections by means of thick arrows.

The JobManager 12 is connected to the operator control unit 13, the JobServer 21, the CopyController 6, the accounting and security unit 27 and, via the network 10 and the InputHandler 15 and OutputHandler 16, to the workstations 11a–c. The latter connection is indicated diagrammatically by direct broken-line arrows. Apart from being connected to the JobManager 12, the JobServer 21 is also connected to the storage unit 20, the InputHandler 15, the OutputHandler 16, the PrintHandler 25, the ScanHandler 26 and the conversion unit 28. The CopyController 6 is connected to the scanner unit 3, the set memory 4 and the printer unit 5, and also to the JobManager 12, the PrintHandler 25, the ScanHandler 26 and the accounting and security unit 27.

Digital data files which are sent to the apparatus 1 via the network for printing are either of a first type or a second type. Files of the first type are required to be printed directly, i.e. without further action on the part of an operator at the apparatus, while files of the second type are required only to be stored in the memory of the apparatus and not to be printed until an operator explicitly so requests at the apparatus by selecting by means of the operator control panel. The type of file involved is apparent from an attribute added to the file.

Processing of a data file of the first type is referred to in this description as automatic printing (AP).

Processing of a data file of the second type is referred to as interactive printing (IP). The procedure with this is as follows (see FIG. 2).

A second type data file for printing sent by a workstation via the network is received by the InputHandler 15. The latter extracts from the file a number of predetermined identification data and passes such data to JobServer 21, which in turn transmits the data to JobManager 12. In this example, the extracted identification data comprise the name of the owner and the name of the file itself. The file is then stored unchanged in the storage unit 20, whereafter the apparatus passes into the standby mode. JobManager 12 manages an administration system in which the identification data of all the data files for printing stored in the storage unit 20 are entered. If a new file is supplied via the network, then the JobManager 12 adds the identification data thereof in connection with the name of the owner/sender to the administration system.

The storage unit 20 together with the administration system of the JobManager 12 form, as it were, a set of "logic storage spaces" for data files, each logic storage space being allocated to one user. Thus in actual fact storage in the user's logic storage space means that the file is stored in the storage unit 20 and entered in the administration system in connection with the name of that user. A logic storage space can be protected by a code specific to the owner/user, and in practice this means that an operator can only obtain information concerning the files stored in a specific logic storage space after he has input this code.

There can also be one or more logic storage spaces for general use which are not protected by a code, so that everyone has access to that logic storage space. All kinds of files used by numerous users, for example specific forms, can be stored in a public storage space of this kind.

The manager of the apparatus can set the JobManager 12 so that it does not accept any print jobs which are required to be printed immediately (files of the first type or AP). In that case, the JobManager automatically converts such jobs into interactive print jobs (IP) and stores the data file in storage unit 20 in the form of files of the second type.

When an operator wants to have a specific data file of the second type printed, he must give a command for this by means of the apparatus operator control panel 160. In response to this, the data file is brought out of the storage unit 20 and converted to printable data by the PrintHandler 25, and after intermediate storage in the set memory 4 the data are processed by the printer unit 5 to give a print. A print file of the second type can be protected by with a code by the sender. This code has the form of an attribute to the print file. If a user wants to print this file interactively, he must input the security code on the operator control panel before the file is printed.

When a data file of the second type has been printed, it remains in principle stored in the storage unit 20 until it is removed by the user himself or the manager is of the apparatus. To this end, he gives a command for removal of a selected file. In response to this the JobManager 12 passes a command to the JobServer 21 to erase the intended file from the storage unit 20 and it removes the identification data from that file from its administration system.

Figure 3:
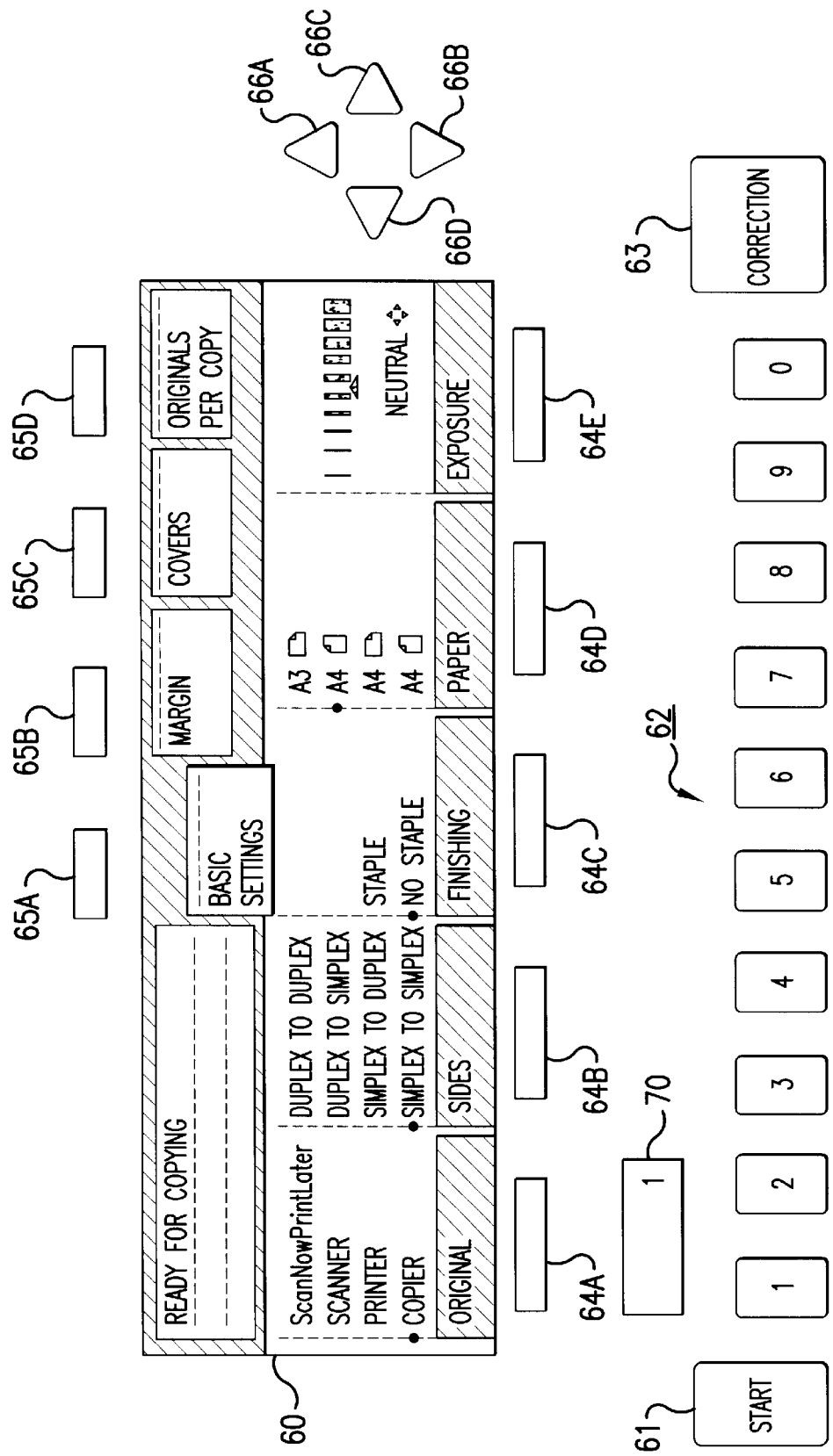
FIGS. 3 and 4 illustrate the apparatus operator control panel in various situations.

The operator control panel 160 belonging to the operator control unit 13 is shown in FIG. 3 and includes a display screen 60, such as an LCD display, and a number of keys, namely a start key 61, number keys 62, correction key 63 and selection keys 64A E, 65A–D and the key cluster 66A–D. All these elements are connected to the operator control unit 13, which in response to operation of the keys passes signals to the JobManager 12 and which also controls the display screen 60 to display options and messages to the operator.

When the apparatus has been switched on, the display screen 60 displays an image formed by a number of vertical columns, each situated above one of the selection keys 64A E. Each column relates to a specific basic function of the apparatus and shows the different possible settings for that basic function. For example, the furthest left column is allocated to the choice between a copying function, in which a document is scanned by the scanner and then reproduced, a printer function for interactive printing, in which a print is made using a data file of the above-mentioned second type sent via the network for printing, a scanner function, in which a document is scanned while generating a scan file that can then be fetched by a workstation, and a deferred copying function ("scan now, print later"), in which a document is scanned while generating a print file of the second type which is stored in the storage unit of the apparatus and can be printed with the printer function. The setting selected at any time, the copying function in this case, is indicated by a marker, such as a dark dot, or by highlighting.

By actuating a selection key an operator can choose a different setting, e.g. in accordance with a cyclic pattern. As a result of a change of a setting the function of one or more of the other selection keys may change, because the old function is no longer relevant and other selection options are required. Different text relating to the new function then appears in the associated column of the display screen 60.

The selection keys 65A–D offer the possibility of bringing up a different set of functions which cannot be displayed by the restricted dimensions of the display screen 60. These are generally functions which are not required for a simple copying or print job, but which offer the operator more options to obtain special printing results. In this example, these functions comprise shifting the margin on the print, adding covers, and multiple up. The meaning of the keys 65A–D is indicated in an associated field in the display screen 60 directly beneath each key. When one of the keys is actuated the corresponding set of functions is activated and the layout of the display screen 60 is adapted to the associated functions. At the same time, this selection is displayed by framing or otherwise making conspicuous that field on the display screen 60 which belongs to the actuated key of the group 65A–D.

The operator control panel 19 also contains a number display 70 to indicate the number of prints set, as is generally customary on copying machines.

If the printer function has been selected by key 64A in the "basic settings" group , the columns above the keys 64B (simplex or duplex, both in respect of the original document and the copy sheet), 64C (stapling) and 64D (the choice of format of the print paper) relate to the finishing of the copying job and the column above key 64E relates to light/dark control for the copy.

Figure 4:
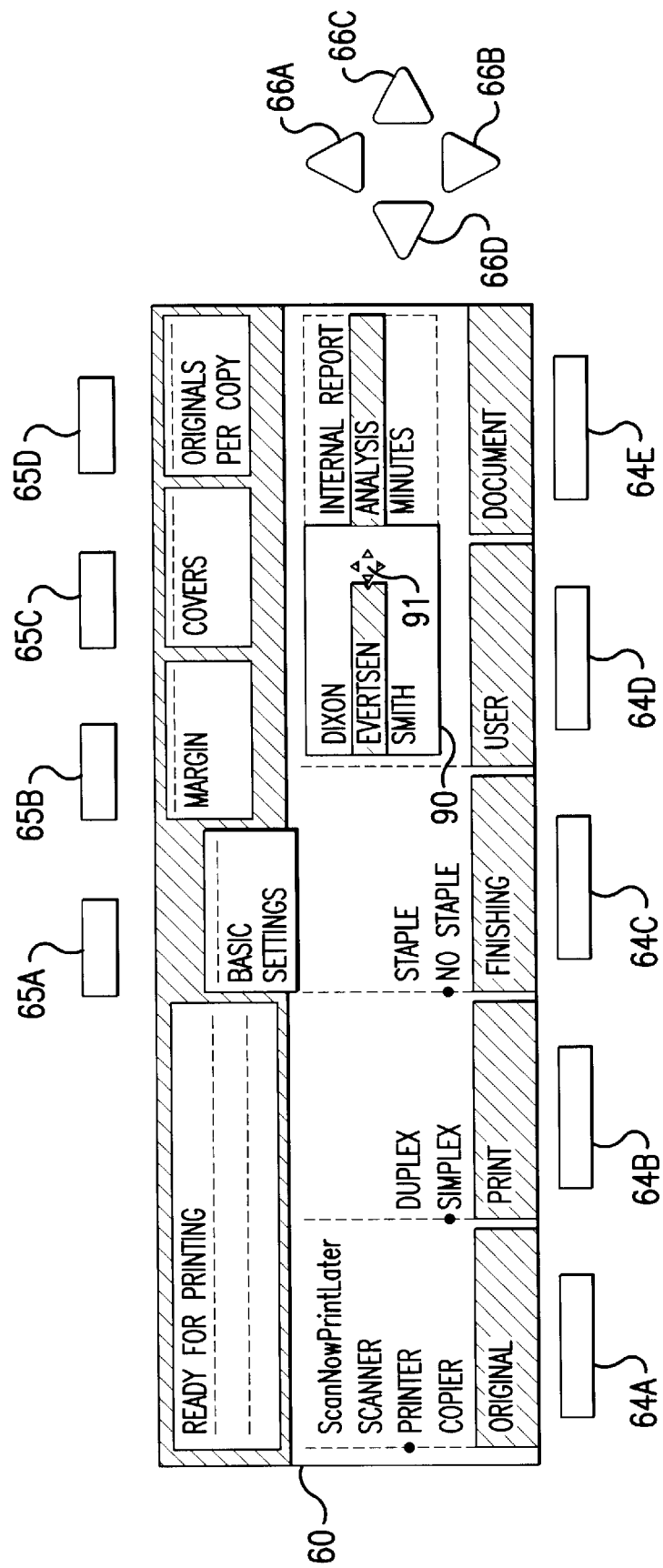

FIG. 4 shows the layout of the display screen 60 after the printer function for interactive printing of data files of the second type has been selected by key 64A in the group "basic settings". In this case the keys 64D and 64E now have the function of specifying the data file for printing by selection of users and file name. Different files of the second type, from different users, may in fact be stored in the memory. All these files are entered in the administration system of the JobManager 12, as described above, and can be displayed on the display screen 60 for selection.

After actuation of key 64D, an operator can select a user name from the list of users who have sent one or more files, and after actuation of key 64E a file name can be selected from the list of files sent by the selected user.

In response to the actuation of key 64D the column on the display screen above this key is provided with a frame 90 and a star symbol 91 to show that a user name can be selected and the star keys 66A–D are active for that selection. As a preselection, the name of the user who last sent a file to the machine is automatically selected as the name.

The pair of keys 66A/B is used to proceed alphabetically through all the user names in the list, forwards with key 66A and backwards with key 66B. If there are more names than can be displayed simultaneously in the frame 90, then as many names as fit within the frame are displayed and the whole list is automatically scrolled through. A bar having text therein in reverse video indicates what name has been selected.

In response to actuation of key 64E, the column of the display screen above that key is provided with a frame and a star symbol in exactly the same way as the procedure on actuation of key 64D as described above, in order to indicate that a file name can be selected and that the star keys 66A–D are active for that selection. The selection with the star keys is exactly the same as to that involved in the selection of a user name. The last file sent is selected, for example, as a preselection.

After selection of a file, the printing process is started by actuating the start key 61.

The operation of the accounting and security unit 27 will now be explained by reference to FIG. 5A and FIG. 5B. This unit both controls access to the copying, scanning and printing, and the accounting for copies, scans and prints made. It has available a database in which an entry can be made for each user by the apparatus manager. For a user, a user code (hereinafter referred to as the "PIN" code) is stored at his user name and a total to which is added the copies and prints made. Each user name also has an authorization code stored to determine the authorization of the relevant user to make use of the apparatus. This can be set up by the apparatus manager, so that access can, for example, be occasionally denied. The authorization can also be automatically denied to a specific user if, for example, a predetermined credit has been used up.

Figure 5A:
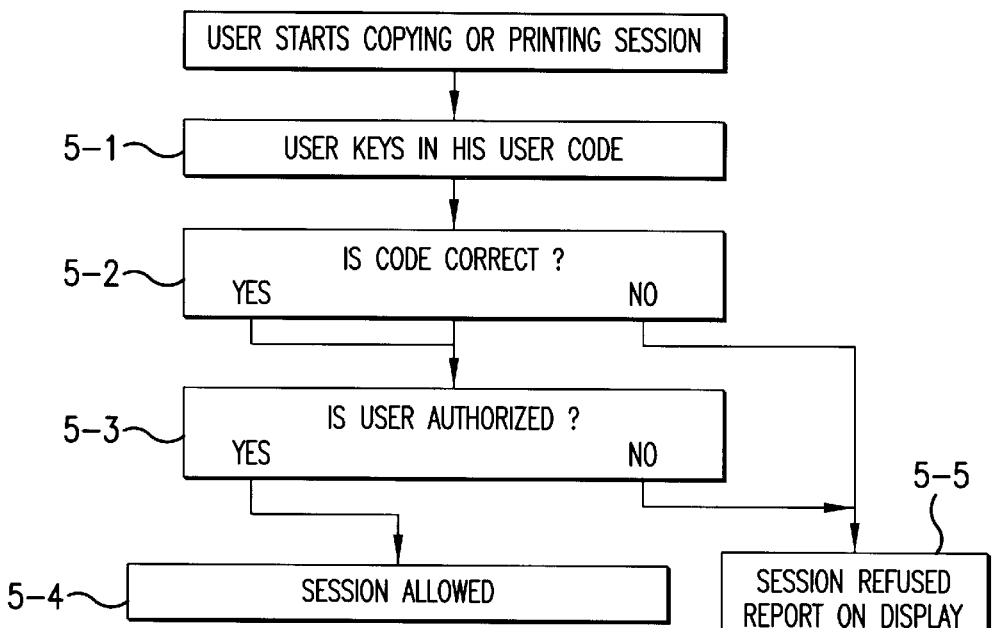
FIGS. 5A and 5B are flow diagrams to explain the operation of the apparatus accounting and security unit.

FIG. 5A describes the case in which a user makes a copy or print at the apparatus. In that case he must first input his user code by means of the number keys on the operator control panel (5-1). If the code is correct (5-2), the accounting and security unit 27 checks the authorization (5-3). And if this is also in order then the relevant user may make his copies, scans or prints (5-4) and these are added to the user's total usage. If either the user code is incorrect or the user is not authorized, then the unit 27 refuses to release the apparatus for use and reports this on the display on the operator control panel (5-5).

Figure 5B:
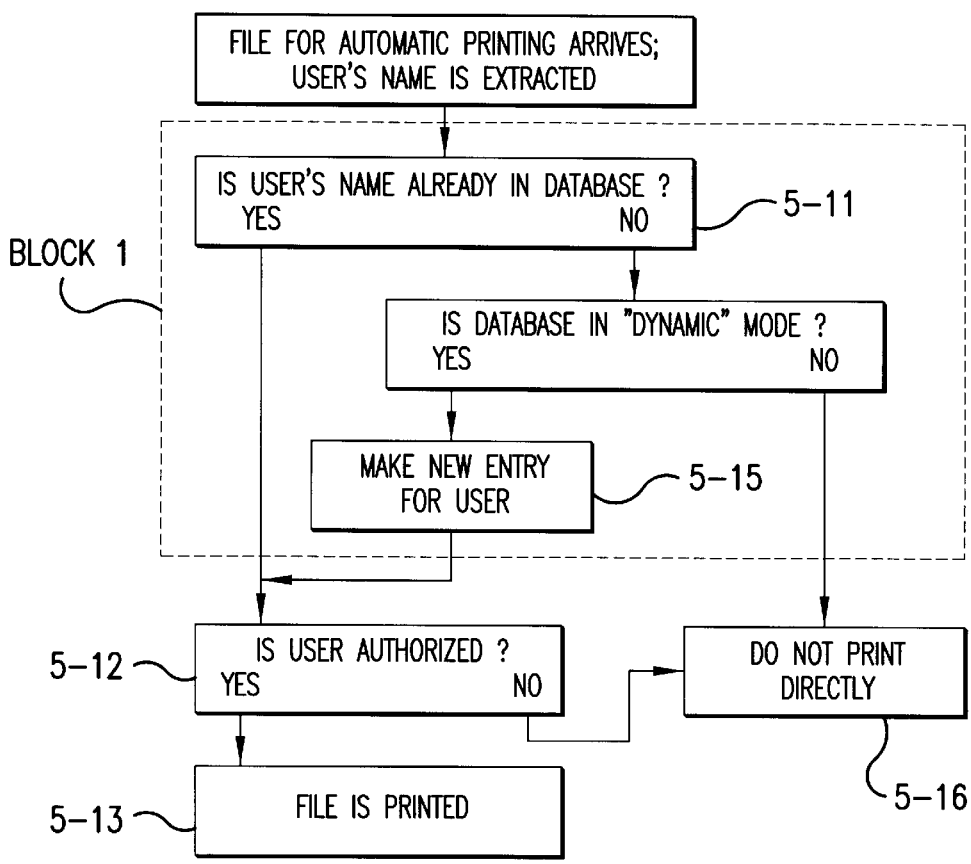

FIG. 5B describes the case in which a user sends a digital data file from his workstation to the apparatus for immediate printing. The task of the accounting and security unit 27 then consists firstly in checking whether the user name, which always forms part of the data file, occurs in the database (5-11).

If the database does not contain the user's name for a received print file, then the accounting and security unit 27 makes a new entry in the database (5-15) for this user's name, with an automatic authorization. The mode in which the accounting and security unit 27 does this is hereinafter referred to as the "dynamic mode". It may be that the accounting and security unit 27 has been brought into a different mode, hereinafter referred to as the "static mode", by the apparatus manager, in which case the user's name is not added to the database and the print job is automatically not carried out (5-16). This first treatment is indicated in FIG. 5B in a block I having a broken-line frame.

If the check in block I has a positive result, then the authorization is checked (5-12) and if it is also in order then the print file is processed further (5-13), the prints being added to the user's total usage.

The access system of the accounting and security unit 27 can also be switched off so that anyone can without difficulty copy, scan and, from a workstation, print. In relation to a print job from the operating control panel on the apparatus, the access system remains partially active, namely for protecting individual print files, as will be described hereinafter.

Copying

Figure 6:
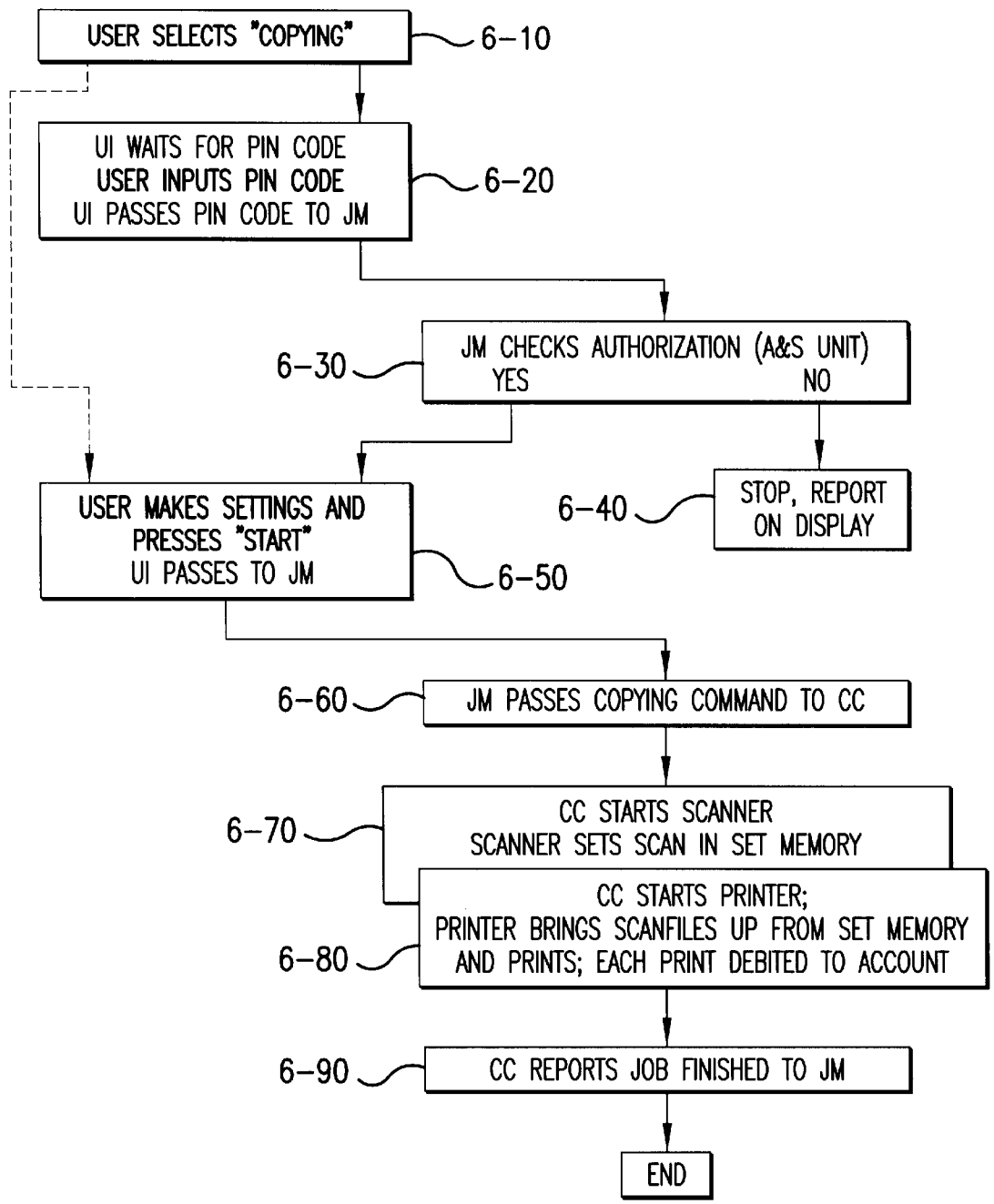
FIG. 6 is a flow diagram of a process for making a copy according to the invention.

FIG. 6 shows the procedure for making a copy. It is assumed in this case that the access system of the accounting and security unit 27 is switched on.

At the start of the process (6-10), the apparatus is in the "copying" mode or the operator selects that mode by means of key 64A on the operator control panel 160. The operator control unit 13 now waits for a user code and when the operator inputs this passes it through to the JobManager 12 (6-20). By means of the accounting and security unit 27 the JobManager 12 checks the authorization of the relevant user (6-30). If this is not in order, then the JobManager refuses to make a copy and reports this on the display on the operator control panel 160 (6-40).

If the authorization is in order, then the operator can start copying, by making settings for the process on the operator control panel, placing documents in the input tray 111 of the document feeder 110 and actuating the start key 61 (6-50).

The settings and the start command are then transmitted by the operator control unit 13 to the JobManager 12.

If the access system of the accounting and security unit 27 was switched off, then step 6-50 immediately follows step 6-10.

The JobManager 12 then gives a command to the Copy-Controller 6 to activate the various parts of the apparatus (6-60). On the command of the CopyController 6 the scanner unit 3, including the document feeder 110, is now started to scan documents one by one and pass the digital data thus generated to the set memory 4, and the printer unit 5 is started to read the digital data out of the set memory 4 and print them on sheets of paper (6-70 and 6-80).

When all the documents have been scanned and printed, the CopyController 6 reports the job finished to the JobManager 12 (6-90) and the copying action is completed.

Reception of a Print File

Figure 7:
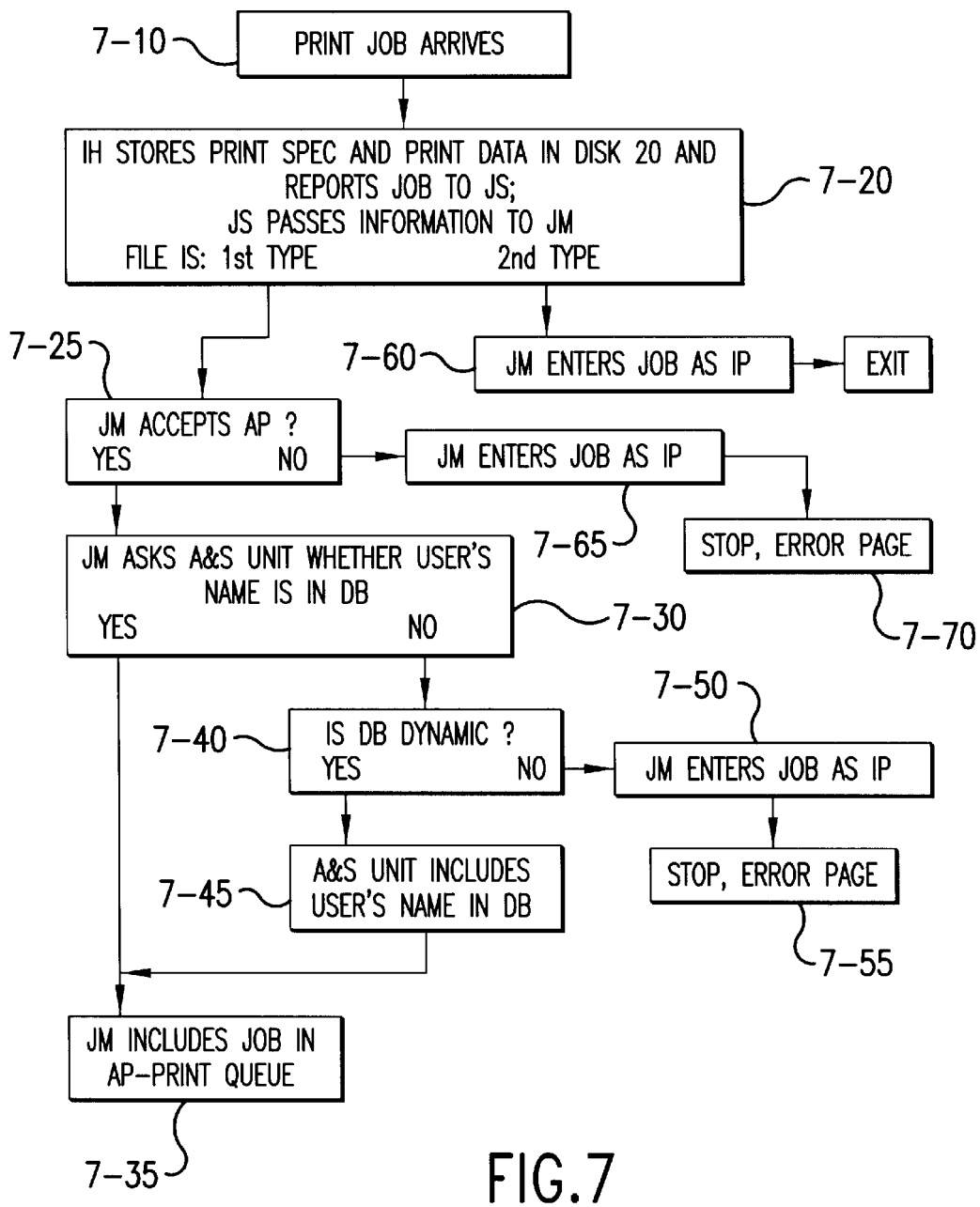
FIG. 7 is a flow diagram of a reception process for print files according to the invention.

FIG. 7 is a description of the procedure on the arrival, via the network, of a data file of the first or second type for printing.

The relevant data file is received (7-10) by InputHandler 15. This extracts identification data (including the name of the user and of the file) and print specifications (e.g. printing and finishing parameters), determines whether it is a print file of the first (AP) or of the second (IP) type, reports the job to the JobServer 21 and stores the entire file, i.e. the print specifications and the image data for printing, in the storage unit 20 (7-20). The JobServer 21 in turn reports the job, with the relevant data, to the JobManager 12.

If the print file is of the second type, the JobManager enters the job as such in its job administration system (7-60), whereafter no further activities take place in respect of this job.

If the print file is of the first type, the further handling (7-25) thereof depends on whether the JobManager 12 is in the mode in which it accepts automatic print jobs (AP). If not, the JobManager enters the print job in its job administration system as being an interactive print job IP and does not pass to direct printing (7-65). A print-out can be made, however, giving the reasons why the job has not been carried out (7-70).

If the JobManager 12 is in the mode in which it does accept automatic print jobs, it calls in the accounting and security unit 27 to determine whether the job can be processed (7-30). The accounting and security unit 27 proceeds as described in connection with block I in FIG. 5B. If this check (7-40) shows that the file may not be printed, then the JobManager enters the print job (7-50) in its job administration system as being an interactive print job (IP) and does not pass to direct printing. A message can be printed out on a sheet of paper, however, giving the reasons why the job has not been carried out (7-55).

If the check by the accounting and security unit 27 proves positive, the JobManager includes the job in the print queue (7-35) for automatic print jobs (APqueue), where it has to wait its turn for processing.

Interactive Printing

Figure 8:
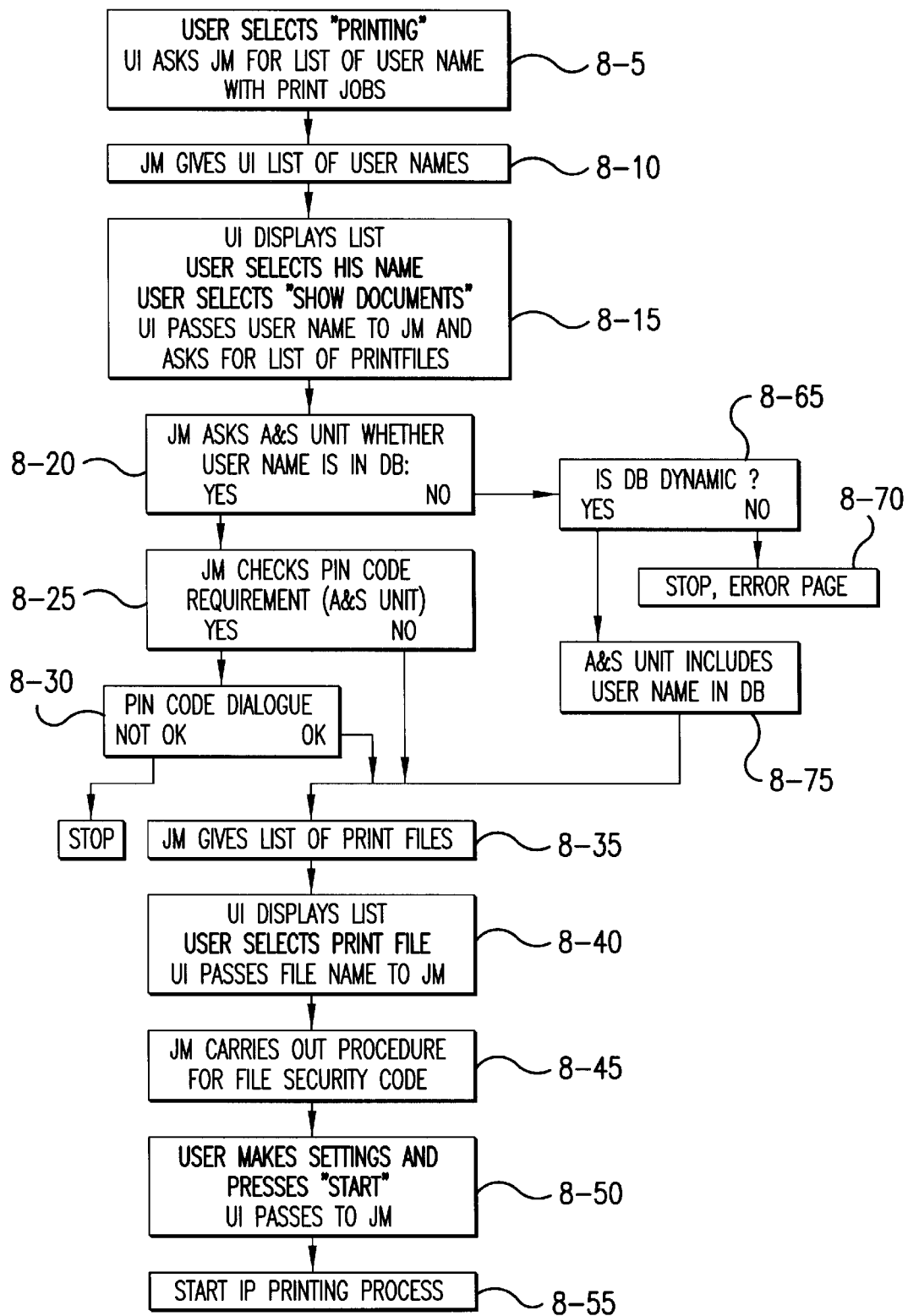
FIG. 8 is a flow diagram of the initial procedure of an interactive printing process according to the invention.

FIG. 8 shows the course of events when a user gives an interactive print order with the aid of the operator control unit 13 on the apparatus operator control panel.

The user will start by selecting the print function (8-5) with key 64A (FIGS. 3/4). The operator control unit 13 then passes a request to the JobManager 12 to pass a list of all the users who have sent a print job of the second type that at that moment are still stored in storage unit 20. In response to that request, the JobManager makes up a current list and passes it to the operator control unit 13 (8-10).

The operator control unit displays this list on the display, in the column above key 64D (FIG. 4), whereafter the user can select his name. After the user has done this, he actuates key 64E to obtain an overview of his own print jobs. In response to this, the operator control unit 13 gives the selected user's name and a request for a list of print jobs of that user to the JobManager (8-15).

The JobManager now asks (8-20) the accounting and security unit 27 whether the relevant user's name occurs in its database. The unit 27 then proceeds as described in connection with block I in FIG. 5B. If the name really does occur in the database, the JobManager asks the accounting and security unit 27 whether there is a user's code for this user's name (8-25), and, if so, it conducts a dialogue with the user through the agency of the operator control unit 13 in order to check the user's code (8-30). If the result is positive, the JobManager makes up a current list of interactive print jobs (8-35) of the relevant user and passes it through to the operator control unit 13, which submits this list to the user for selection on display 60.

The user now selects a print file (8-40), the name of which is transmitted by the operator control unit 13 to the JobManager 12. The latter now first executes a control procedure (8-45) for possible file protection. In so doing it inquires from the is JobServer 21 whether a security code has been sent with the selected file, and the latter checks the stored file for this. If the file is actually protected, the JobManager through the intermediary of the operator control unit again carries out a dialogue with the user, in which it asks for a code and checks it. If the result is positive, the JobManager releases the file for printing, and the user can set finishing parameters on the operator control panel (8-50), whereafter the user can start the printing process by actuating the start key 61 to start the interactive printing process (8-55).

When a user has sent a number of print files each provided with a security code, and wishes subsequently to print them all interactively, then after a first print file the JobManager 12 first applies the test to the next print file as to whether the security code or codes used by the user during the current session is/are still valid for the current file, and will not start a new check dialogue with the user until the current file has a different security code. The term "session" used here denotes a continuous series of actions at the machine, includes copying, printing and/or scanning, carried out by one user. A session is terminated by the user deselecting his name, another user selecting his name, or by the user carrying out no actions for a predetermined time. In the latter case, a "time-out" mechanism ensures that the name of the user is deselected.

In this way a user can work faster if he gives a series of print files the same security code. For printing he then only needs to input the code the first time. The use of a single security code is also convenient because the user does not then have to remember a number of different codes.

This procedure is explained by the following example. Let us assume that a user has sent the following series of print files to the apparatus for interactive printing:

File 1, security code 123
File 2, security code 123
File 3, no security code
File 4, security code 123
File 5, security code 456
File 6, security code 456
File 6, security code 123

If the user now selects the files consecutively for printing at the apparatus, he must input the code 123 at file 1, whereafter the JobManager releases the document for printing. File 2 is automatically released because the code of file 1 is also valid for this. File 3 has no security code and is therefore printed without checking. File 4 has the same security code as the preceding protected file, and is therefore automatically released also. File 5 has a different security code, and here the user must again input a code, whereafter file 6 is automatically released.

Finally, file 7 is again automatically released, since this security code has been used previously and maintained.

In an alternative embodiment, only the last security code used is maintained. In that case, therefore, the code 123 again has to be input by the user for file 7, since a different code was used in the meantime.

A user may select a series of files in one operation in order to have them all printed thereafter by one actuation of the start key 61. In that case, the JobManager proceeds in accordance with the same procedure as above, but the selection of a subsequent file always takes place automatically until the series of selected files has been completely finished.

Figure 13:
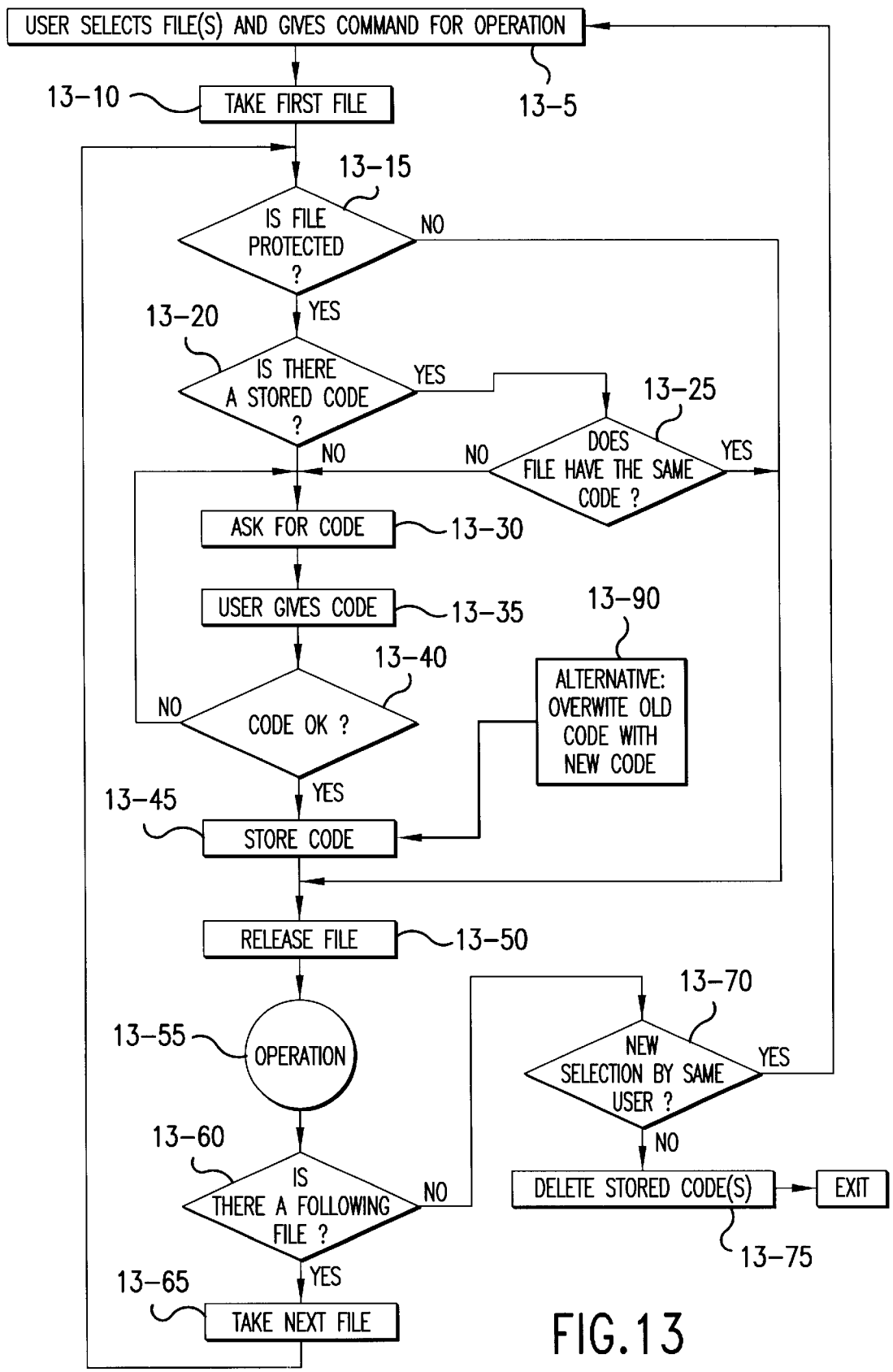
FIG. 13 is a flow diagram for a procedure for handling series of protected files according to the invention.

The above-mentioned procedure for handling protected files is discussed in greater detail hereinafter with reference to FIG. 13.

Printing Process

Figure 9:
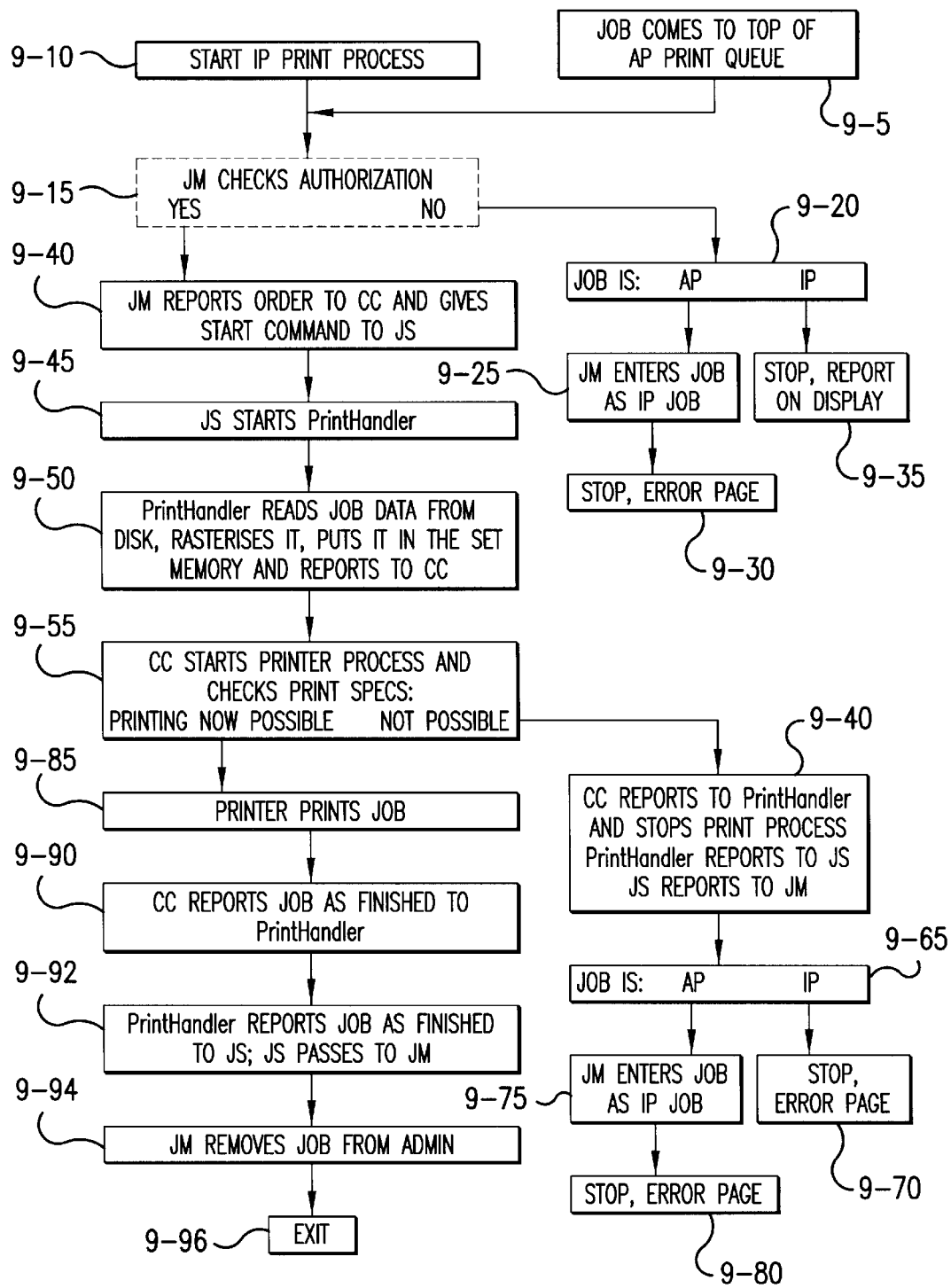
FIG. 9 is a flow diagram of a printing process according to the invention.

FIG. 9 shows the progress of the printing process started either by the JobManager 12 when a print job of the first type (AP) reaches the head of the AP queue (9-5), or by the user as an interactive print job (IP) (9-10). It should be noted here that the JobManager is so programmed as to be able to start an automatic print job only if no activity has been observed on the operator control panel for a predetermined time, e.g. 30 seconds. This prevents a user occupied in a job at the operator control panel from being disturbed by the sudden start of an automatic print job.

If the access system of the accounting and security unit 27 is switched on, the JobManager now first checks the authorization (9-15) of the relevant user (the owner of the print job). If the authorization is not in order, the process is interrupted (9-20). If the print job is an automatic print job, the JobManager records the print file as being of the second type (9-25) and does not print it (9-30). It is possible to make a print giving the reasons why the job has not been carried out. In the case of an interactive print job, the JobManager refuses the order and displays (9-35) a report thereof on the display at the operator control unit 13.

If the user is authorized, the JobManager reports the print job to the CopyController 6 and gives a start command (9-40) for this order to the JobServer, which in turn starts up (9-45) the PrintHandler 25, so that the latter reads the relevant print file from the storage unit 20, rasterises it, and stores it (9-50) in the set memory 4. On a report from the PrintHandler to the CopyController 6 to the effect that sufficient image data are stored in the set memory, the CopyController starts (9-55) the printer unit 5 to make a print.

In this connection (9-55) the CopyController first checks whether the print specifications belonging to the print job have been satisfied, for example if there is a stock of the required type of image supports (format, orientation, color). If these specifications have not been met, then the job is stopped. The CopyController reports (9-60) this to the PrintHandler, which passes the report through to the JobServer, the latter in turn passes (9-65) it to the JobManager, and the latter reports (9-70), in the case of an interactive print job, the impossibility for printing to be carried out, to the user by a message on the display of the operator control unit 13 or, in the case of an automatic print job, alters (9-75) the description of the job in its administration system to an interactive print job, so that a user can consequently still start the job from the operator control panel at a later moment. Once again a print can be made (9-80) showing the reasons why the job has not been carried out.

If the print job can be processed, the printer unit 5 reads the image data out of the set memory 4, prints them (9-85), and reports (9-90) this to the CopyController 6. When the complete print job has been carried out, the CopyController reports (9-92) this to the PrintHandler 25, which passes this to the JobServer 21, and the latter in turn to the JobManager 12, which then removes (9-94) the job from its administration system, thus completing (9-96) the printing process.

Scanning

Figure 10:
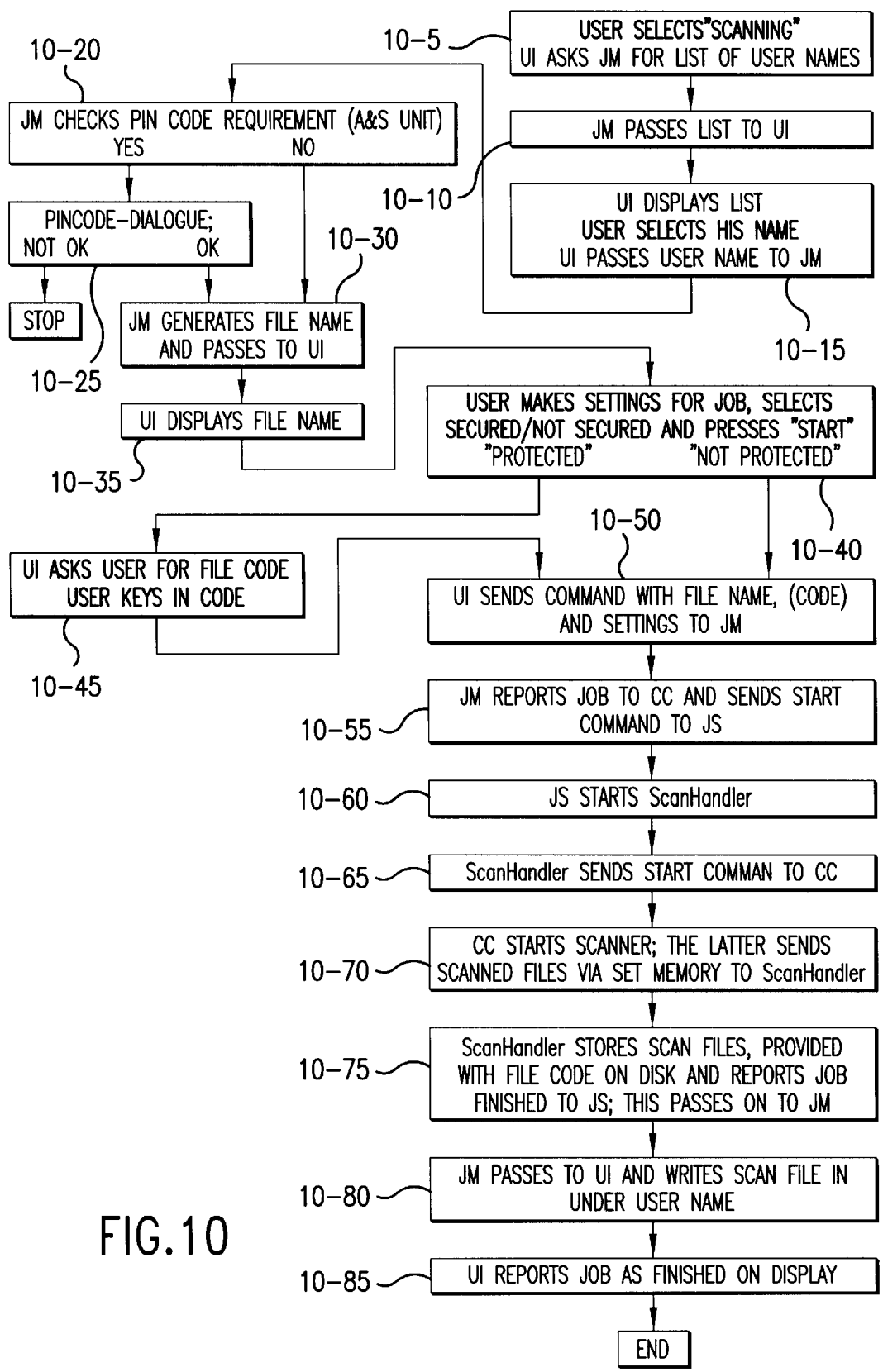
FIG. 10 is a flow diagram of a scan process according to the invention.

FIG. 10 shows the procedure when a user wishes to have a document scanned by the apparatus in order that the digital data generated in these conditions, hereinafter referred to as the scan file, may be further used for processing or storage at his workstation. The scan file in this case is not transmitted to a predetermined address over the network immediately after generation as is usually the case, but is stored in the storage unit 20 of the apparatus, whereafter it must be called up from a workstation. The procedure with this is as follows.

Using the key 64A on the operator control panel of the operator control unit 13 the user selects (10-5) the "scanner" option. In response to this the operator control unit asks the JobManager 12 for a list of all the names of users known to the JobManager, i.e.: all the user names in the database of the accounting and security unit 27. As already stated previously, these user names can be entered in the database by the apparatus manager or be automatically added by the accounting and security unit 27 on receipt of a print order from a workstation. Also, when a program intended for communication with the apparatus is started at a workstation this program can automatically be reported to the apparatus JobManager which then ensures that an entry for the user of the workstation is made in the database.

In an alternative embodiment, the user names in the database are provided with an attribute which indicates whether they are authorized to make use of the scan function. In that case the list contains only the names of the authorized users.

Figure 11:
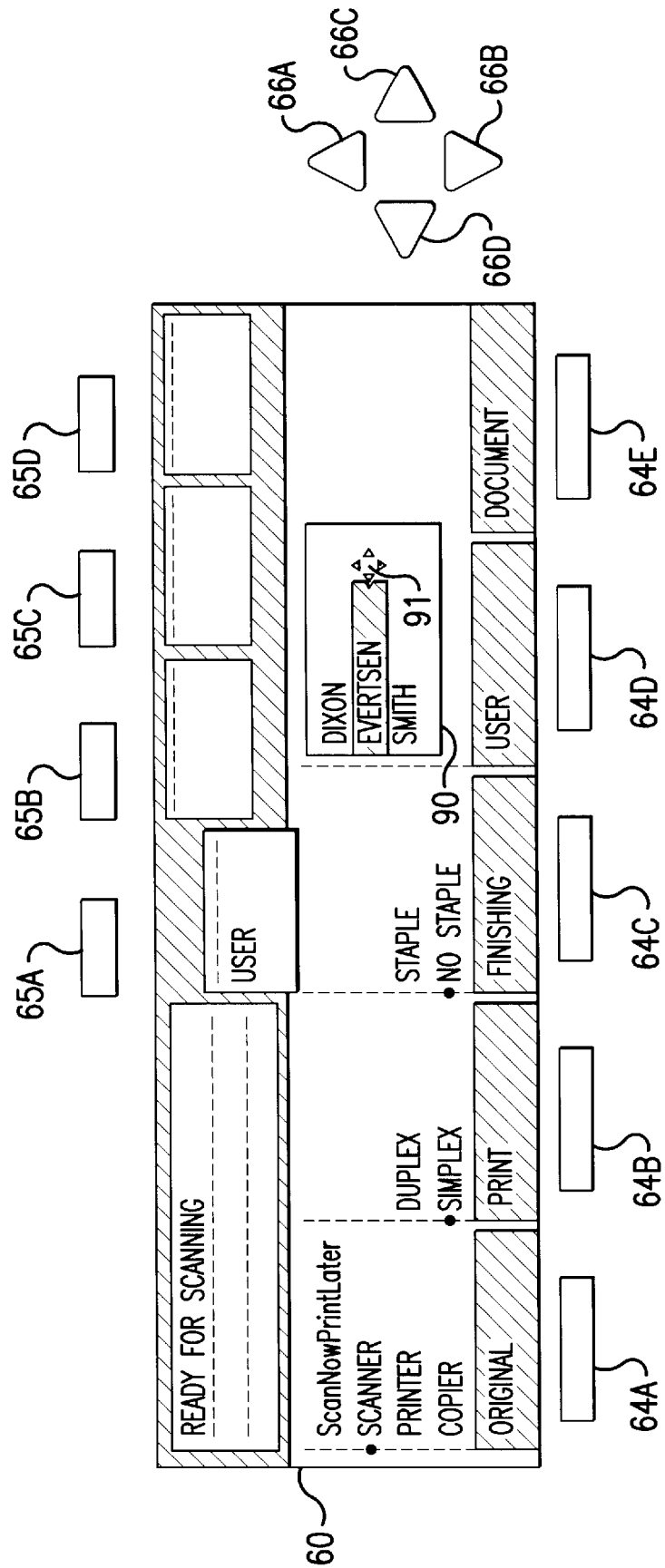
FIG. 11 illustrates the operator control panel according to the invention.

The JobManager passes (10-10) the list of the user names through to the operator control unit 13, which displays (10-15) this on the display 60 for selection by the operator. This is shown in FIG. 11, which illustrates the display 60 after selection of the scanner function.

After the user has selected his name, the operator control unit passes this through to the JobManager 12, which by using the accounting and security unit 27 then checks (10-20) whether a user code is necessary to obtain access to the scanner function. If that is the case, then by means of the operator control unit 13 it conducts a dialogue (10-25) with the user in order to check his code. In the case of a positive result, the JobManager releases the scanner function and automatically generates (10-30) a name for the data file to be made during scanning, and this is passed to the operator control unit 13, which in turn displays (10-35) this file name on the display 60, so that the user subsequently knows the name by which he can find the scan file. This automatically generated name can, for example, have the form: YYYYMMDDhhmmssxxx, which successively shows the year, month, date, hour, minute and second of the scan action, and the serial number of the document in the scanned set.

In addition, the operator control unit now displays in a form similar to the form for selection of settings for a copying or printing process (cf. FIGS. 3 and 4), a possible choice for parameters of the scan process, such as the resolution, the format (e.g. TIFF, BMP, etc.), the magnification factor, and whether the original document is to be scanned on one side or both sides. The user can select (10-40) his settings from this or he can leave the preselected values as they are.

The selectable settings for the scan file which is to be generated also include protection by a security code or not.

The user then places his original documents in the input tray 111 of the document feeder 110 and actuates the start key 61. If the user has selected a security code, the operator control unit 13 asks (10-45) the user first to input a code, and then sends (10-50) a start command with all the data, including the code, to the JobManager 12. If no security code was selected, the step of asking (10-45) for a code is skipped.

The JobManager now reports (10-55) the job to the CopyController 6 and sends a start command to the JobServer 21, which in turns starts (10-60) the ScanHandler 26. The latter transmits (10-65) a start command to the CopyController 6, which controls the scanner unit 3 in order to transport the original documents one by one to the scanner, scan them, and generate scan files. In these conditions the scanner unit counts the number of original pages scanned. The scan files are stored in the set memory 4 and then transmitted (10-70) to the ScanHandler, which stores (10-75) them in the storage unit 20, in combination with the security code inputted by the user. In addition, the image processing function of the set memory also makes a file with a reduced image of the scanned image, known as a "thumbnail", and this is also stored in the storage unit 20.

Thumbnails of this kind are used later for identification in the selection of a scan file.

When all the documents have been scanned, the ScanHandler 26 reports (10-75) the job as finished to the JobServer, which in turn transmits this to the JobManager. The latter passes (10-80) the finished report to the operator control unit 13, which displays (10-85) it on the display 60 of the operator control panel, together with the number of pages scanned, so that the user can check whether any documents have been skipped. That concludes the scan job.

Fetching a Scan File Using the Workstation

Figure 12B:
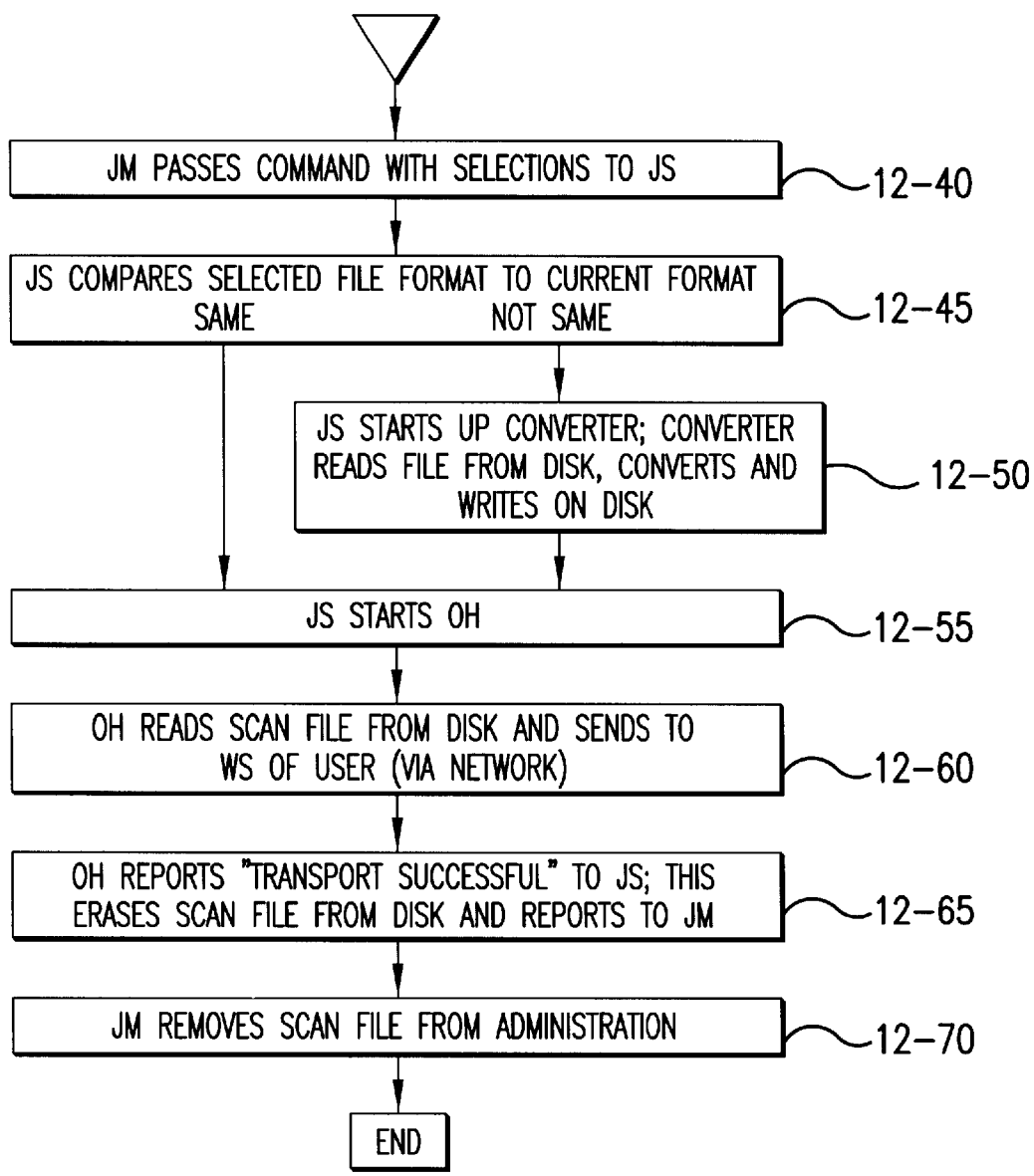

FIG. 12, which includes subparts 12A and 12B interrelated as shown, depicts the procedure when a user wishes to fetch a scan file stored there under his name, using his workstation.

The WS program for communication with the apparatus is also required for this operation. As already stated, this program is provided with its own user identification and authorization procedure.

In the WS program, the user now selects (12-5) a presentation function for all the scan files stored under his name in the storage unit 20. The WS program then asks for the list of these from the JobManager 12, which compiles the list from its own administration system and sends (12-10) it back. In addition, the JobManager 12 by means of the JobServer 21 and OutputHandler 16 sends to the workstation the thumbnail belonging to each scan file. This can, for example, also be the thumbnail of the first page of a multi-page document.

The WS program now displays (12-15) on the workstation screen the list of scan files with the associated thumbnails for selection by the user. The user is also offered a choice for the transport mode (encrypted or not), the required format of the file, and the name under which the file is to be imported (note that the file still has an automatically generated name which contains no information as to the contents). After making the settings, the user selects the function "upload", whereupon the WS program sends a request to the JobManager 12 to forward the selected file.

The JobManager now asks (12-20) the JobServer 21 whether this file is protected with a code, and if so, through the intermediary of the WS program (12-25), it asks (12-30) the user for the code. If the user gives the correct code (12-35), the JobManager releases the file. If the file is not protected, the JobManager immediately releases the file.

The JobManager 12 then gives an order (12-40) for the file to be sent to the JobServer 21, which compares (12-45) the file format selected by the user with the current format in which the file is stored in the storage unit 20. If the two formats are different, the JobServer 21 gives the conversion unit 28 an order (12-50) to read out the file, convert it, and store it again in the storage unit 20.

The JobServer then starts (12-55) the OutputHandler 16 to transmit (12-60) the file to the workstation. When it has completed its task, it reports (12-65) this to the JobServer 21, which erases (12-70) the file from the storage unit 20 and passes it on to the JobManager 12, which in turn removes the file from its administration system. Alternatively, the scan file can be kept until the user removes it actively.

When a user calls up a number of scan files together or in series, the JobManager in checking security codes again operates in accordance with the procedure in which codes already used are first tested before the user is asked for a code, so that in the case of a series of files having the same code the user does not always need to input that code. This procedure has already been referred to in connection with interactive printing and will be described in detail hereinafter with reference to FIG. 13.

Deferred Copying

A "deferred copying" function is also supported by means of the described embodiments of scanning and printing. In this function an original document or a set of documents is scanned, whereafter the digital image data thus generated are stored in the storage unit 20 under the user's name, and can then, at a later time, be brought up for printing. This progresses as follows.

The function is started by selecting the option "deferred copying" (scan now-print later) in the column above key 64A on the operator control panel. This is then followed by exactly the same procedure as described with reference to FIG. 10 for the scanning of documents, in which case the file of generated image data is now so administered by the JobManager that when the interactive print function is called up it is included in the list of files for selection for printing. If the user so whishes, a security code can be associated to the scan files also in this function. The process is completed on completion of the scan job.

In order then to print the file, a user should select the option "printer" in the column above key 64A on the operator control panel, in which case as already described the scan files of "deferred copying" jobs are now also displayed for selection in the column above key 64E. The printing process is fully identical to that described with reference to FIG. 8, including any check for a file security code. Once again, if a series of protected files has been selected together or in series, it can first automatically try out a code used previously in the same session before the user is asked for the code.

The above-mentioned procedure for handling series of protected files will now be explained with reference to the flow diagram in FIG. 13.

In the following description, the term "session" denotes a continuous series of actions by one user at the machine. A session starts with a user selecting his name in the operator control display screen, and terminates by the same user deselecting his name, a different user name being selected, or by the JobManager automatically terminating the session on expiry of a predetermined time ("time-out") after an action by a user at the machine, during which time no new action is carried out.

In a basic embodiment, each code used during a session is stored and tried out on a subsequent protected file. In an alternative embodiment, only the code last used during the session is maintained and tried out.

After a user has selected (13-5) a file or a series of files together and has given a start command for a specific operation to be carried out (e.g. printing) on said file or files, the required operation is carried out file by file (13-10).

First of all the JobManager 12 by using the JobServer 21 checks (13-15) whether the file in question is provided with a security code. If not, the JobManager releases (13-50) the file for processing, this being denoted by the term "operation" in a circle (13-55) in FIG. 13.

If the file is protected, the JobManager 12 checks (13-20) whether a security code has already been input since the start of the session. If so, the JobManager tests (13-25) whether the same code or, if more codes have already been used, one of such codes, is also valid for the file now being dealt with. In the latter case, the JobManager again immediately releases (13-50) the file for the required operation. If none of the codes tried out is valid for the file now being handled or if there is no stored code, the JobManager 12 through the agency of the operator control unit 13 carries out a dialogue (13-30, 13-35) with the user, in which the JobManager 12 asks the user for the code.

If the latter inputs the correct code, the JobManager releases (13-50) the file for processing and at the same time stores (13-45) the input code in its memory. In the alternative embodiment, in which only one code is maintained, the JobManager overwrites (13-90) any code already stored with the newly input code, so that only the last code used is available.

After completion of the required operation on the treated file, the JobManager checks (13-60) whether another file has been selected, and the entire action is carried out afresh for the next file (13-65).

If there are no more files, the JobManager waits for a predetermined time interval ("time-out"), to see whether a new file selection (13-70) is carried out by the same user. If this is not the case, or if a different user reports in the meantime, then the JobManager removes the file code from its memory and terminates the session and erases (13-75) from the memory all the security codes stored during the session.

If the user makes a new file selection (13-5), the procedure described starts afresh.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A method of making available digital image data files in a digital processing apparatus, the method comprising:
   a) receiving a selection by an operator, of a digital image file from among a plurality of digital image files for the purpose of further handling;
   b) checking whether the selected file is provided with a security code;
   c) asking the operator, if the selected file is provided with a security code, to input an access code corresponding to the security code;
   d) releasing the selected file for further handling, if the operator inputs the correct access code;
   e) maintaining the correct access code for the time of an uninterrupted series of selection actions by the operator;
   f) automatically determining, as part of a second procedure for releasing a second selected file provided with a security code, where the second procedure follows on at least one first procedure for releasing a first selected file provided with a security code and wherein said second procedure takes place within said uninterrupted series of selection actions by the operator, whether a maintained access code for a first file is also correct for the second file; and
   g) asking the operator, if no maintained access code correct for the second file appears to be available, to input an access code for the second file.

2. The method according to claim 1,
   wherein in said step f) each access code maintained in a previous procedure for releasing the first file provided with a security code is tried out.

3. The method according to claim 1,
   wherein in said step f) only the access code maintained in the procedure for releasing the first file provided with a security code directly preceding the procedure for the release of the second file is tried out.

4. The method according to claim 1,
   wherein the method forms part of a printing process including:
   selecting, by an operator, at least one stored digital image data file, which file is provided with a security code;
   checking, in accordance with the method, an access code input by the operator; and
   if the result of the check is positive, printing the selected digital image data file on a command by the operator.

5. The method according to claim 2,
   wherein the method forms part of a printing process including:
   selecting, by an operator, at least one stored digital image data file, which file is provided with a security code;
   checking, in accordance with the method, an access code input by the operator; and
   if the result of the check is positive, printing the selected digital image data file on a command by the operator.

6. The method according to claim 3,
   wherein the method forms part of a printing process including:
   selecting, by an operator, at least one stored digital image data file, which file is provided with a security code;
   checking, in accordance with the method, an access code input by the operator; and
   if the result of the check is positive, printing the selected digital image data file on a command by the operator.

7. The method according to claim 1,
   wherein the method forms part of a scan process including:
   scanning one or more documents and in so doing generating digital image data files;
   providing the generated digital image data files with a security code,
   storing the generated digital image data files together with their security code;
   using the method to make the files available for further processing.

8. The method according to claim 2,
   wherein the method forms part of a scan process including:
   scanning one or more documents and in so doing generating digital image data files;
   providing the generated digital image data files with a security code,
   storing the generated digital image data files together with their security code;
   using the method to make the files available for further processing.

9. The method according to claim 3,
   wherein the method forms part of a scan process including:
   scanning one or more documents and in so doing generating digital image data files;
   providing the generated digital image data files with a security code,
   storing the generated digital image data files together with their security code;
   using the method to make the files available for further processing.

10. A digital image processing apparatus comprising:
    a storage unit for storing digital data files for printing;
    a control unit; and
    an operator control unit connected to the control unit, for communicating with an operator, wherein said control unit is operable to receive a selection by an operator, of a digital image file from among a plurality of digital image files for the purpose of further handling, said control unit also including:

means for checking whether a selected file is provided with a security code;

means for asking the operator, if the selected file is provided with a security code, to input an access code corresponding to the security code;

means for releasing the selected file for further handling, if the operator inputs the correct access code; and means for maintaining the correct access code for the time of an uninterrupted series of selection actions by the operator, said control unit being adapted, for the purpose of releasing a second selected file provided with a security code within said uninterrupted series of selection actions by the operator, to determine whether the maintained access code for a first selected file is also correct for the second file, and said control unit being operable to ask the operator, if no maintained access code correct for the second file appears to be available, to input an access code for the second file.

11. The digital image processing apparatus according to claim 10, wherein said means for maintaining the correct access code maintains all the correct access codes used during the uninterrupted series of selection actions.

12. The digital image processing apparatus according to claim 10, wherein said means for maintaining the correct access code maintains only the correct access code used most recently during the uninterrupted series of selection actions.

13. The digital image processing apparatus according to claim 10, further comprising:

a printing unit, wherein the further handling includes printing a selected file with said printer.

14. The digital image processing apparatus according to claim 10, further comprising:

a scanner unit, wherein the files for selection include files of digital image data generated during a scanning job performed by said scanner unit.

\* \* \* \* \*